(12) United States Patent
Kim et al.

(10) Patent No.: US 11,807,076 B2
(45) Date of Patent: Nov. 7, 2023

(54) DUAL COMPRESSOR FOR VEHICLE

(71) Applicants: HYUNDAI MOTOR COMPANY, Seoul (KR); KIA CORPORATION, Seoul (KR); DOOWON HEAVY INDUSTRIAL CO., LTD., Sacheon-si (KR)

(72) Inventors: Jae Yeon Kim, Hwaseong-si (KR); Yeonho Kim, Seoul (KR); Hochan An, Hwaseong-si (KR); Jeawan Kim, Gwangmyeong-si (KR); Seung Bin Jung, Anseong-si (KR); Sang Soo Kim, Anseong-si (KR); Dong Lim Nam, Yongin-si (KR)

(73) Assignees: HYUNDAI MOTOR COMPANY, Seoul (KR); KIA CORPORATION, Seoul (KR); DOOWON HEAVY INDUSTRIAL CO., LTD., Sacheon-si (KR)

( * ) Notice: Subject to any disclaimer, the term of this patent is extended or adjusted under 35 U.S.C. 154(b) by 219 days.

(21) Appl. No.: 17/514,869

(22) Filed: Oct. 29, 2021

(65) Prior Publication Data
US 2022/0371408 A1 Nov. 24, 2022

(30) Foreign Application Priority Data
May 18, 2021 (KR) .................. 10-2021-0063905

(51) Int. Cl.
*B60H 1/32* (2006.01)
*H02P 5/74* (2006.01)

(52) U.S. Cl.
CPC ............. *B60H 1/3223* (2013.01); *H02P 5/74* (2013.01)

(58) Field of Classification Search
CPC ....... B60H 1/3223; B60H 1/3222; H02P 5/74; H02P 5/46; H02P 25/02; H02P 27/06; F25B 5/02; F25B 31/00; F25B 41/42; F25B 2400/0751; F04B 41/06; F04B 35/04; F04B 39/06; F04B 49/06; F05B 2210/14
See application file for complete search history.

(56) References Cited

FOREIGN PATENT DOCUMENTS

| CN | 1639466 A | * | 7/2005 | ............ F04D 25/06 |
| KR | 20170044802 A | * | 4/2017 | ........... B60H 1/3222 |
| KR | 20170069377 A | * | 6/2017 | ........... B60H 1/3204 |
| KR | 1020170069377 A | | 6/2017 | |

* cited by examiner

*Primary Examiner* — Emmanuel E Duke
(74) *Attorney, Agent, or Firm* — MCDONNELL BOEHNEN HULBERT & BERGHOFF LLP

(57) ABSTRACT

A dual compressor for a vehicle comprises a first motor, a first shaft connected to the first motor to transmit a torque of the first motor, a first compressing unit connected to the first shaft to compress a refrigerant according to the operation of the first motor, a second motor, a second shaft connected to the second motor to transmit a torque of the second motor, a second compressing unit connected to the second shaft to compress a refrigerant according to the operation of the second motor, and an inverter electrically connected to the first and second motors to drive the first and second motors by converting DC power supplied from a vehicle into AC power, and controlling the output of the first compressing unit or the second compressing unit by controlling the power applied to the first motor or the second motor.

15 Claims, 3 Drawing Sheets

DUAL COMPRESSOR FOR VEHICLE

CROSS-REFERENCE TO RELATED APPLICATION

This application claims priority to and the benefit of Korean Patent Application No. 10-2021-0063905 filed in the Korean Intellectual Property Office on May 18, 2021, the entire contents of which are incorporated herein by reference.

BACKGROUND

(a) Field of the Disclosure

The present disclosure relates to a dual compressor for a vehicle. More particularly, the present disclosure relates to a dual compressor for a vehicle in which two compressing units are integrally configured and independently controlled.

(b) Description of the Related Art

Generally, an air condition system for a vehicle includes an air conditioner device circulating a refrigerant in order to heat or cool an interior of the vehicle.

The air conditioner device, which is to maintain the interior of the vehicle at an appropriate temperature regardless of a change in an external temperature to maintain a comfortable interior environment, is configured to heat or cool the interior of the vehicle by heat exchange by an evaporator in a process in which a refrigerant discharged by driving of a compressor is circulated to the compressor through a condenser, a receiver drier, an expansion valve, and the evaporator.

That is, the air conditioner device lowers a temperature and a humidity of the interior by condensing a high-temperature, high-pressure, gas-phase refrigerant compressed from the compressor, by the condenser, passing the refrigerant through the receiver drier and the expansion valve, and then evaporating the refrigerant in the evaporator in a cooling mode.

Here, when the compressor is a mechanical type operated by receiving a driving torque from the engine, the performance varies according to the rotation speed of the engine or the vehicle speed. That is, when the engine speed is high, the compressor performance is high, but when the engine speed is low, the compressor performance of the air conditioner device is relatively low.

Therefore, in the vehicle, the lowered performance is compensated by adjusting an opening degree of a temperature control door.

On the other hand, an electric compressor is used in the air conditioner device of a hybrid vehicle or an electric vehicle.

The electric compressor does not differ much in composition or operation principle from the general compressor, but it receives the torque of a motor driven by using power charged in the battery as the driving torque to discharge a refrigerator.

In this embodiment, the electric compressor is driven using the power charged in the battery, so it has a characteristic that it can exhibit constant performance regardless of the vehicle speed or engine speed.

Therefore, in the embodiment of the air conditioner equipped with the electric compressor, unlike the air conditioner equipped with the mechanical compressor, the electric compressor may be controlled with the same output as in the high-speed running state and even in the vehicle idle state with low vehicle speed and engine speed.

However, since the electric compressor consumes a lot of power, the load of the vehicle may be increased, and as the power consumption speed of the battery increases, it may adversely affect the power supply required for driving.

On the other hand, in recent years, to improve the cooling or heating performance of the air conditioner device, multiple stages of the refrigerant cycle in which the refrigerant is circulated are required.

Here, the multiple stages of the refrigerant cycle apply at least two refrigerant cycles in which the different refrigerants are circulated to one air conditioner device.

However, in the air conditioner device to which the multi-stage refrigerant cycle is applied, as additional constituent elements for composing a plurality of refrigerant cycles are increased, it difficult to secure a mounting space, and as two electric compressors are applied, there is a drawback that the power consumption of the battery is increased.

In addition, the electric compressors applied to each refrigerant cycle require each inverter to convert the DC power supplied from the vehicle to AC power, so there is a drawback that the overall manufacturing cost is increased and simultaneously the weight is increased.

On the other hand, to solve these drawbacks, a dual compressor using one motor in common is applied, but there is a problem that it is difficult to control two compressors independently with one motor.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a dual compressor for a vehicle in which two compressing units are integrally configured and independently controlled with one inverter.

A dual compressor for a vehicle according to an embodiment of the present disclosure includes: a first motor that operates according to whether power is applied, a first shaft connected to the first motor to transmit a torque of the first motor, a first compressing unit connected to the first shaft to compress a refrigerant according to the operation of the first motor, a second motor that operates according to whether power is applied, a second shaft connected to the second motor to transmit a torque of the second motor, a second compressing unit connected to the second shaft to compress a refrigerant according to the operation of the second motor, and an inverter electrically connected to the first and second motors, respectively, to drive the first and second motors by converting DC power supplied from a vehicle into AC power, and controlling the output of the first compressing unit or the second compressing unit by controlling the power applied to the first motor or the second motor.

The inverter may independently control any one motor among the first motor and the second motor, or simultaneously control the first motor and the second motor.

The inverter may control so that different voltages are input to the first motor and the second motor.

The first and second compressing units may be electric compressors.

The inverter may include a motor control unit controlling the first motor or the second motor; and at least one insulated gate bipolar transistor electrically connected to the motor control unit and electrically connected to the first motor or the second motor.

The at least one insulated gate bipolar transistor may include a first insulated gate bipolar transistor electrically connected to the first motor, and a second insulated gate bipolar transistor electrically connected to the second motor.

The first motor may be a motor of a different type from that of the second motor.

The capacity of the first motor may be different from that of the second motor.

The first compressing unit and the second compressing unit may be formed to have different capacities according to the capacities of the first and second motors.

The capacity of one motor among the first motor and the second motor may be larger than the capacity of the other motor.

The first motor may be a brushless direct current motor, and the second motor may be an induction motor or a DC motor (a direct current motor).

At least one refrigerant passage cooling the inverter by using each refrigerant flowing into the first compressing unit or the second compressing unit through the first motor or the second motor from at least one evaporator maybe further included.

At least one refrigerant passage may be disposed at a position close to the inverter so as to cool heat generated from the inverter during the inverter operation.

At least one refrigerant passage may receive a refrigerant from at least one evaporator to cool the inverter and inflow the refrigerant to the first compressing unit or the second compressing unit.

The first motor, the first shaft, the first compressing unit, the second motor, the second shaft, the second compressing unit, the inverter, and the refrigerant passage may be provided inside one housing and integrally configured.

As above-described, according to the dual compressor for the vehicle according to an embodiment of the present disclosure, two compressing units are integrally configured and the compressing units are independently controlled with one inverter, thereby increasing usage efficiency.

In addition, the present disclosure may operate each compressing unit in a high efficiency section according to the condition through the inverter, so that the power consumption of the battery may be minimized, and the overall travel distance of the vehicle may increase.

In addition, the present disclosure may reduce the manufacturing cost and reduce the weight through the simplification of the constituent elements by configuring two compressing units as an integral type, and may improve space utilization and packageability.

Furthermore, the present disclosure may increase overall durability and lifespan by efficiently cooling the inverter using the refrigerant supplied to each compressing unit.

DETAILED DESCRIPTION

Figure 1:
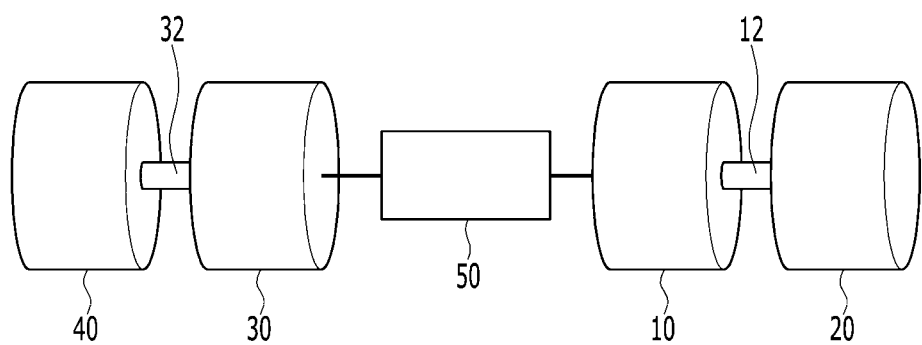
FIG. 1 is a schematic diagram of a dual compressor for a vehicle according to an embodiment of the present disclosure.

Embodiments of the present disclosure will hereinafter be described in detail with reference to the accompanying drawings.

Embodiments described in the present specification and a configuration shown in the drawings are just the most preferable embodiment of the present disclosure, but are not limited to the spirit and scope of the present disclosure. Therefore, it should be understood that there may be various equivalents and modifications capable of replacing them at the time of filing of the present application.

In order to clarify the present disclosure, description of parts that are not connected with the description will be omitted, and the same elements or equivalents are referred to by the same reference numerals throughout the specification.

The size and thickness of each element are arbitrarily shown in the drawings, and the present disclosure is not necessarily limited thereto, and in the drawings, the thickness of layers, films, panels, regions, etc., are exaggerated for clarity.

In addition, unless explicitly described to the contrary, the word "comprise", and variations such as "comprises" or "comprising", will be understood to imply the inclusion of stated elements but not the exclusion of any other elements.

Further, the terms, "unit", "mechanism", "portion", "member", etc. used herein mean a unit of inclusive components performing at least one or more functions or operations.

FIG. 1 is a schematic diagram of a dual compressor for a vehicle according to an embodiment of the present disclosure.

Referring to FIG. 1, the dual compressor for the vehicle according to an embodiment of the present disclosure includes a first motor 10, a first shaft 12, a first compressing unit 20, a second motor 30, a second shaft 32, a second compressing unit 40, and an inverter 50.

First, the first motor 10 is an electric motor that operates according to whether power is applied, and may generate a torque by using power supplied from the vehicle's battery.

The first shaft 12 is connected to the first motor 10 to transmit the torque of the first motor 10.

Also, the first compressing unit 20 is connected to the first shaft 12 to compress the refrigerant according to the operation of the first motor 10.

That is, the first compressing unit 20 may be an electric compressor driven by the first motor 10. The first compressing unit 20 may include a scroll-type electric compressor.

In the present embodiment, the second motor 30 is an electric motor that operates depending on whether power is applied, and may generate torque using the power supplied from the vehicle's battery.

The second shaft 32 is connected to the second motor 30 to transmit the torque of the second motor 30.

Also, the second compressing unit 40 is connected to the second shaft 32 to compress the refrigerant according to the operation of the second motor 30.

That is, the second compressing unit 40 may be an electric compressor driven by the second motor 30. The second compressing unit 40 may include a scroll-type electric compressor.

Here, the first motor 10 may be a different type of motor from the second motor 30. For example, the first motor 10 may be a brushless direct current motor. Also, the second motor 30 may be an induction motor, or a DC motor (a direct current motor).

In the present embodiment, it is described that the first motor 10 is the brushless motor and the second motor 30 is the induction motor or the DC motor as an embodiment, but it is not limited thereto, and the types of the first and second motors 10 and 30 may be changed and applied.

In addition, in the present embodiment, it is described that the first and second compressing units 20 and 40 are the scroll type of electric compressor as an embodiment, but it is not limited thereto, and may be applied as an electric compressor of another method.

On the other hand, in the present embodiment, the capacity of the first motor 10 is different from that of the second motor 30.

That is, one of the first motor 10 and the second motor 30 may have a larger capacity than the other motor capacity.

Here, the first compressing unit 20 and the second compressing unit 40 are formed to have different capacities according to the capacities of the first and second motors 10 and 30.

For example, when the capacity of the first motor 10 is greater than the capacity of the second motor 30, the capacity of the first compressing unit 20 may have greater capacity than that of the second compressing unit 40.

Conversely, when the capacity of the first motor 10 is less than the capacity of the second motor 30, the capacity of the first compressing unit 20 may be smaller than that of the second compressing unit 40.

That is, the dual compressor according to an embodiment of the present disclosure may apply a compressor with a large capacity to a cycle that requires more refrigerant flow in a refrigerant cycle applied to an air conditioner for controlling the indoor temperature of a vehicle, or a sub-refrigerant cycle that supplies heat from an auxiliary heat source to improve the performance and efficiency of the refrigerant cycle.

The dual compressor configured in this way may be selectively applied to a refrigerant cycle applied to an air conditioner, a refrigerant cycle for controlling the temperature of the battery, or a sub-refrigerant cycle that supplies heat from an auxiliary heat source.

Accordingly, the first compressing unit 20 or the second compressing unit 40 may be selectively used for indoor temperature control of the vehicle, temperature control of the battery, or supply control of the auxiliary heat source.

In the present embodiment, the inverter 50 is electrically connected to the first and second motors 10 and 30, respectively, to convert the DC power supplied from the vehicle into the AC power to drive the first and second motors 10 and 30.

The inverter 50 may control the output of the first compressing unit 20 or the second compressing unit 30 by adjusting the power applied to the first motor 10 or the second motor 30.

Here, the inverter 50 may control so that different voltages are input to the first motor 10 and the second motor 30.

That is, when the capacity of the first motor 10 is formed to be larger than the capacity of the second motor 20, the inverter 50 may apply a high voltage to the first motor 10 and a low voltage to the second motor 30.

On the contrary, when the capacity of the first motor 10 is smaller than the capacity of the second motor 20, the inverter 50 may apply a low voltage to the first motor 10 and a high voltage to the second motor 30.

Here, the inverter 50 may independently control either one of the first motor 10 and the second motor 20, or simultaneously control the first and second motors 10 and 20.

In the present embodiment, the configuration of the inverter 50 is described in further detail with reference to attached FIG. 2.

Figure 2:
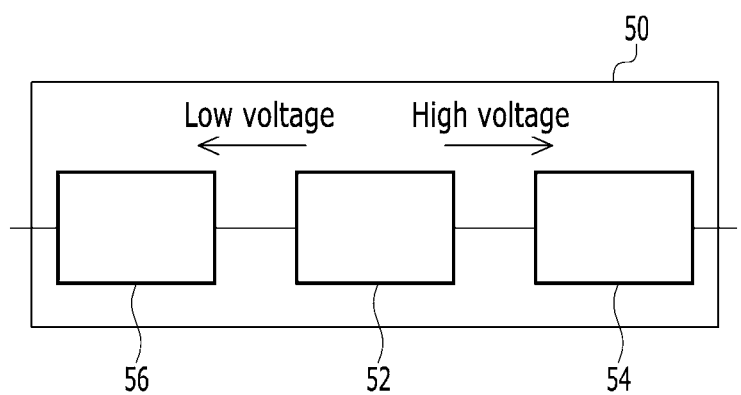
FIG. 2 is a schematic diagram of an inverter applied to a dual compressor for a vehicle according to an embodiment of the present disclosure.

FIG. 2 is a schematic diagram of an inverter applied to a dual compressor for a vehicle according to an embodiment of the present disclosure.

Referring to FIG. 2, the inverter 50 may include a motor control unit 52 controlling the first motor 10 or the second motor 30, and at least one insulated gate bipolar transistor electrically connected to the motor control unit 52 and electrically connected to the first motor 10 or the second motor 20.

Here, at least one insulated gate bipolar transistor may include a first insulated gate bipolar transistor 54 electrically connected to the first motor 10 and a second insulated gate bipolar transistor 56 electrically connected to the second motor 30.

Accordingly, the inverter 50 may apply a high voltage to the first insulated gate bipolar transistor 54 such that a high voltage is applied to the first motor 10 having a relatively large capacity according to the control of the motor control unit 52.

In addition, the inverter 50 may apply a low voltage to the second insulated gate bipolar transistor 54 such that a low voltage is applied to the second motor 30 having a relatively small capacity according to the control of the motor control unit 52.

Meanwhile, in FIG. 2, the case in which the inverter 50 is formed with the greater capacity than that of the first motor 10 by the capacity of the second motor 30 is described as an embodiment, but it is not limited thereto, and when the capacity of the first motor 10 is formed to be smaller than that of the second motor 20, the inverter 50 may apply a low voltage to the first motor 10 and apply a high voltage to the second motor 30.

That is, the inverter 50 according to an embodiment of the present disclosure may input the high voltage and the low voltage to the first and second insulated gate bipolar transistor 54 and 52, respectively, through the control of the motor control unit 52, so that the different voltages are applied to the first and second motors 10 and 30.

On the other hand, in the present embodiment, the dual compressor may further include at least one refrigerant passage 81 for cooling the inverter 50 by using each refrigerant flowing into the first compressing unit 20 and the second compressing unit 40 through the first motor 10 and the second motor 30 from at least one evaporator.

Figure 3:
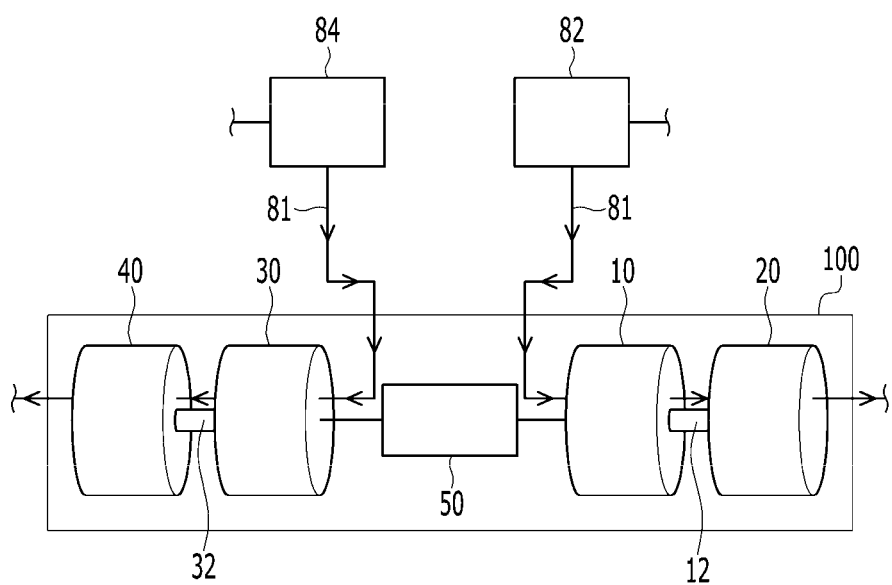
FIG. 3 is a view schematically showing a flow path of a refrigerant flowing into a refrigerant passage in a dual compressor for a vehicle according to an embodiment of the present disclosure.

FIG. 3 is a view schematically showing a flow path of a refrigerant flowing into a refrigerant passage in a dual compressor for a vehicle according to an embodiment of the present disclosure.

Referring to FIG. 3, at least one refrigerant passage 81 may cool the inverter 50 by using each refrigerant flowing into the first compressing unit 20 or the second compressing unit 40.

This refrigerant passage 81 may be disposed at a position close to the inverter 50 to cool the heat generated from the inverter 50 during the operation of the inverter 50.

The refrigerant passage 81 may connect at least one evaporator, and the first compressing unit 20 or the second compressing unit 40.

That is, at least one refrigerant passage 81 is disposed with the inverter 50 interposed therebetween to be connected to the first compressing unit 20 and the second compressing unit 40 through the first motor 10 and the second motor 30.

The refrigerant passage 81 disposed on the side of the first compressing unit 20 is connected to a first evaporator 82 which is connected to the first compressing unit 20 through the first motor 10.

The refrigerant passage 81 disposed on the side of the second compressing unit 40 may be connected to a second evaporator 84 which is connected to the second compressing unit 40 through the second motor 30.

The refrigerant passage 81 configured in this manner may cool the inverter 50 while the refrigerant flows therethrough, selectively supplied from the first and second evaporators 82 and 84.

Then, the refrigerant cooling the inverter 50 may pass through the first motor 10 or the second motor 30 to flow into the first compressing unit 20 or the second compressing unit 40.

That is, the refrigerant passage 81 may efficiently cool the inverter 50 using refrigerant supplied from the first evaporator 82 or the second evaporator 84 to the first compressing unit 20 or the second compressing unit 40.

The first motor 10, the first shaft 12, the first compressing unit 20, the second motor 30, the second shaft 32, the second compressing unit 40, the inverter 50, and the refrigerant passage 81 configured in this manner may be provided inside one housing 100 and configured as an integral body type.

As the dual compressor according to an embodiment of the present disclosure is configured as an integral body in which each constituent element is provided inside the housing 100, it is possible to reduce a mounting space and improve packageability.

In addition, the dual compressor may use only one inverter 50 controlling both the first motor 10 and the second motor 30 with different capacities, or independently controlling them.

Further, since the dual compressor may configure the capacity of the first and second compressing units 20 and 40 differently according to the capacity of the first and second motors 10 and 30 to operate each of the first compressing unit 20 and the second compressing unit 40 in the high-efficiency section, it may be possible to operate with higher efficiency than a dual compressor using one motor.

Therefore, a dual compressor for a vehicle according to an embodiment of the present disclosure and configured as described above, provides the first and second compressing units 20 and 40 connected to the first and second motors 10 and 30, respectively, being integrally configured and the first and second motors 10 and 30 connected to the first and second compressing units 20 and 40, respectively, being independently controlled with one inverter 50, thereby increasing usage efficiency.

In addition, such a dual compressor according to the present disclosure may operate the first compressing unit 20 or the second compressing unit 40 in a high efficiency section according to the condition through the inverter 50, so that the power consumption of the battery may be minimized, and the overall travel distance of the vehicle may increase.

In addition, the embodiments described in the present disclosure may reduce the manufacturing cost and reduce the weight through the simplification of the constituent elements by configuring the first and second compressing units 20 and 40 as an integral type, and may improve space utilization and packageability.

Furthermore, the present disclosure discloses disposing the refrigerant passage 81, through which the refrigerant flows, to cool the inverter 50 using the refrigerant respectively supplied to the first and second compressing units 20 and 40, closing to the inverter 50, and efficiently cooling the inverter 50 using the refrigerant, thereby increasing the overall durability and lifespan.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A dual compressor fora vehicle, comprising:
a first motor that operates according to whether power is applied;
a first shaft connected to the first motor to transmit a torque of the first motor;
a first compressing unit connected to the first shaft to compress a refrigerant according to the operation of the first motor;
a second motor that operates according to whether power is applied;
a second shaft connected to the second motor to transmit a torque of the second motor;
a second compressing unit connected to the second shaft to compress a refrigerant according to the operation of the second motor; and
an inverter electrically connected to the first and second motors, respectively, to drive the first and second motors by converting DC power supplied from a vehicle into AC power, and controlling the output of the first compressing unit or the second compressing unit by controlling the power applied to the first motor or the second motor.

2. The dual compressor for the vehicle of claim 1, wherein the inverter independently controls any one motor among the first motor and the second motor, or simultaneously controls the first and second motors.

3. The dual compressor for the vehicle of claim 1, wherein the inverter controls so that different voltages are input to the first motor and the second motor.

4. The dual compressor for the vehicle of claim 1, wherein the first and second compressing units are electric compressors.

5. The dual compressor for the vehicle of claim 1, wherein the inverter includes:
a motor control unit controlling the first motor or the second motor; and
at least one insulated gate bipolar transistor electrically connected to the motor control unit and electrically connected to the first motor or the second motor.

6. The dual compressor for the vehicle of claim 5, wherein the at least one insulated gate bipolar transistor includes:
a first insulated gate bipolar transistor electrically connected to the first motor; and
a second insulated gate bipolar transistor electrically connected to the second motor.

7. The dual compressor for the vehicle of claim 1, wherein the first motor is a motor of a different type from that of the second motor.

8. The dual compressor for the vehicle of claim 1, wherein the capacity of the first motor is different from that of the second motor.

9. The dual compressor for the vehicle of claim 8, wherein the first compressing unit and the second compressing unit are formed to have different capacities according to the capacities of the first and second motors.

10. The dual compressor for the vehicle of claim 1, wherein
the capacity of one motor among the first motor and the second motor is larger than that of the other motor.

11. The dual compressor for the vehicle of claim 1, wherein
the first motor is a brushless direct current motor, and
the second motor is an induction motor or a direct current motor (DC motor).

12. The dual compressor for the vehicle of claim 1, further comprising
at least one refrigerant passage cooling the inverter by using each refrigerant flowing into the first compressing unit or the second compressing unit through the first motor or the second motor from at least one evaporator.

13. The dual compressor for the vehicle of claim 12, wherein
at least one refrigerant passage is disposed at a position close to the inverter so as to cool heat generated from the inverter during the inverter operation.

14. The dual compressor for the vehicle of claim 13, wherein
at least one refrigerant passage receives a refrigerant from at least one evaporator to cool the inverter and inflows the refrigerant to the first compressing unit or the second compressing unit.

15. The dual compressor for the vehicle of claim 12, wherein
the first motor, the first shaft, the first compressing unit, the second motor, the second shaft, the second compressing unit, the inverter, and the refrigerant passage are provided inside one housing and integrally configured.

* * * * *